July 17, 1934.  B. M. MILLS  1,966,931
HUMIDITY REGULATOR
Filed May 23, 1933    2 Sheets-Sheet 1
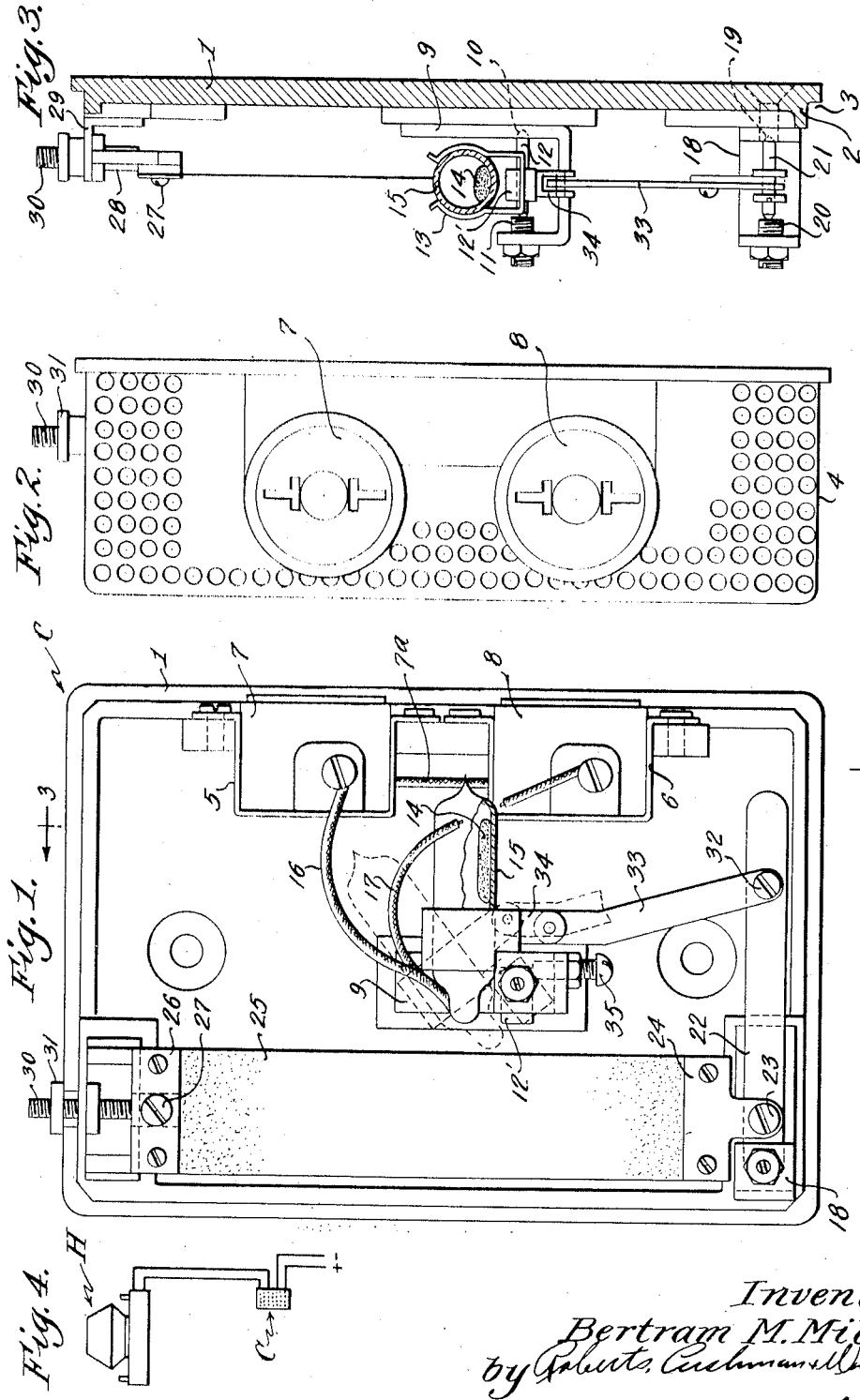
Inventor,
Bertram M. Mills,
by Roberts, Cushman & Woodbury
Att'ys.

July 17, 1934.  B. M. MILLS  1,966,931
HUMIDITY REGULATOR
Filed May 23, 1933  2 Sheets-Sheet 2
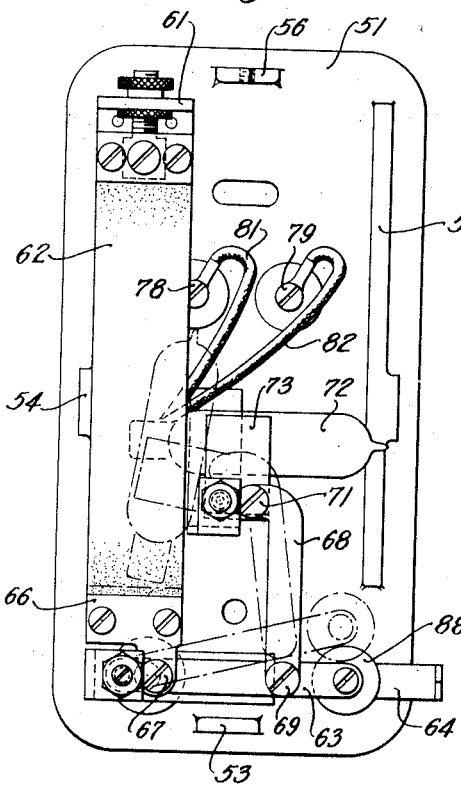
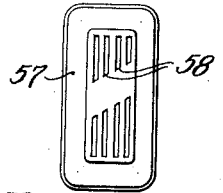
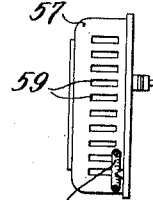
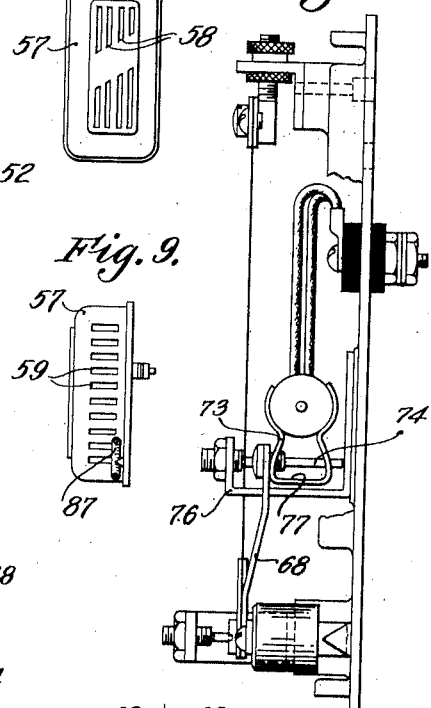
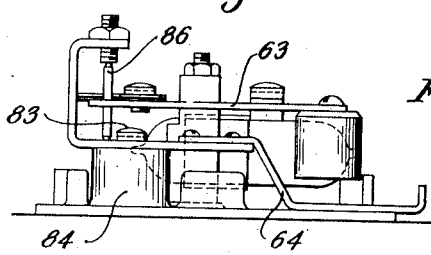
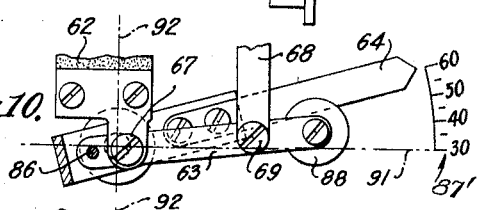
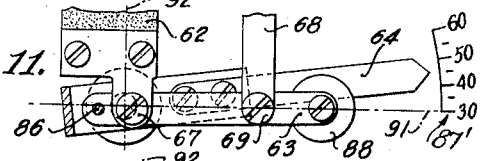
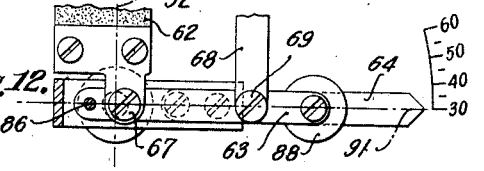
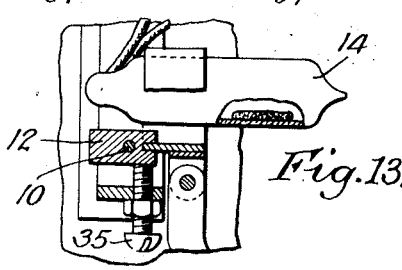
Inventor,
Bertram M. Mills,
by Roberts, Cushman & Woodbury
Attys.

Patented July 17, 1934

1,966,931

UNITED STATES PATENT OFFICE 1,966,931

HUMIDITY REGULATOR

Bertram M. Mills, Pawtucket, R. I., assignor to The Standard Engineering Works, Pawtucket, R. I., a corporation of Rhode Island Application May 23, 1933, Serial No. 672,420

23 Claims. (Cl. 200—52)

This invention pertains to humidity regulators of automatic type for use in determining the action of moistening, drying, heating, or refrigerating apparatus or the like, this application being a continuation-in-part of my application Serial No. 507,192, filed January 7, 1931. Regulators of this kind usually comprise an element which is sensitively responsive to variations in the moisture content of the air, such element acting as the primary motor means for controlling the operation of apparatus which brings about the desired atmospheric condition, for example a predetermined per cent. humidity. The use of air moistening apparatus, which has long been common in certain industrial establishments, for example textile mills, is now being extended to include schools, churches, office buildings, apartment houses and even small dwellings, such apparatus including more or less elaborate permanent installations as well as small portable units adapted for use in restricted quarters. However, while moisture supplying apparatus per se has thus been greatly improved and its use extended,—the automatic controlling devices without which maximum efficiency in humidification can hardly be attained have not been developed to a corresponding degree, and all commercial devices of this kind known to me, if at all reliable, are of elaborate construction and very expensive. Thus the purchaser of a small portable air moistener of inexpensive type may find it necessary to spend several times as much for an automatic controller. The present invention provides a humidity regulator in simplest form and comprising but few parts, most of which are of standard commercial construction. However, this improved apparatus is extremely accurate and capable of adjustment for variable degrees of humidity;—it is small and compact and of pleasing appearance so that it may be installed almost anywhere without inconvenience or detracting from the appearance of the surroundings;—it may be made to sell at a price putting it within the reach of any user of moistening apparatus; it is not substantially affected by vibration;—it requires little care or attention, and is reliable under substantially all conditions.

In the accompanying drawings in which desirable embodiments of the invention have been illustrated by way of example:

Fig. 1 is a front elevation of apparatus, embodying the features of the invention, with the cover removed;

Fig. 2 is a side elevation of the apparatus shown in Fig. 1 with the cover in position;

Fig. 3 is a vertical section substantially on the line 3—3 of Fig. 1;

Fig. 4 is a diagram indicating the application of the controller to a portable humidifier;

Fig. 5 is a front elevation of apparatus similar to that illustrated in Fig. 1, but embodying certain additional features of the invention, the cover of this apparatus being removed;

Fig. 6 is a side elevation of the apparatus illustrated in Fig. 5;

Fig. 7 is a bottom plan view of the apparatus illustrated in Fig. 5;

Fig. 8 is a front elevation, to small scale, of the apparatus of Figs. 5, 6 and 7 with the cover in place;

Fig. 9 is a side elevation, to small scale of this apparatus with the cover in place;

Figs. 10, 11 and 12 are fragmentary views illustrating in front elevation the movable parts in different relative positions; and Fig. 13 is a fragmentary section substantially in the vertical plane of the axis of the switch tube of the device of Fig. 1, showing the stop which limits tilting of the tube in a clockwise direction.

Referring to the drawings, the apparatus C preferably comprises a base plate or support 1, here shown as of substantially rectangular contour and having a forwardly directed flange 2 extending around its marginal portion at a slight distance inward from its edge to provide a recess 3 in which is seated the edge of a cover 4. This cover is preferably of box-like form and may consist of sheet metal or any other desirable material, ornamental or otherwise, and is preferably provided with perforations on all or some of its sides, at least, to permit free entrance of air while at the same time protecting the mechanism from mechanical injury.

Near the right-hand side of this supporting plate 1, as viewed in Fig. 1, two housings 5 and 6 are secured, within which are seated socket members 7 and 8 respectively. These socket members are of the usual type employed for receiving an electrical terminal plug, and may be either of the screw, push or other type,—and are in general representative of any suitable type of terminal for detachably securing electric conductors, and when hereinafter these elements are referred to as "sockets" this term is to be understood with this broad definition. One of these sockets 7, for example, is intended to receive a plug leading from a suitable source of electrical energy, while the other socket 8 is intended to receive a plug leading to the motor drive means of moisture supply or other apparatus, for example a motor-driven humidifier H, one terminal of one socket being connected to one terminal of the other socket by a conductor 7ª. While the housings 6 and 7 are here shown as separate and independent they may, if desired, be united into one, with suitable provision for supporting the sockets 7 and 8 in spaced relation, and these housings may be of insulating or other material as may be found best under any particular circumstances. The cover 4 has an opening or openings in its right-hand side wall to expose the plug receiving ends of the sockets.

As here shown the housings 5 and 6 are at the extreme right-hand side of the plate 1, as viewed in Fig. 1, and substantially midway between the top and bottom of the plate, and to the left of these housings, substantially at the center part of the plate, there is arranged a bracket 9 of more or less U-shape providing cup-like socket bearings 10 and 11 for a staff 12 whose ends are received in the bearing sockets just described and which is free to rock therein. The socket bearing 11 is preferably axially adjustable to take up wear. The staff 12 carries a block 12' supporting a spring clip 13, preferably of U-shape and adapted to receive the tube member 15 of a mercury switch. Such a switch consists of a glass tube containing a pool of mercury 14 and having terminals at one end which are connected electrically by the mercury, when the tube is tipped in one direction, but which are electrically disconnected when the tube is tipped so that the mercury flows toward its other end. When hereinafter the switch is referred to as a mercury switch, it is to be understood that this term indicates a switch such as here defined and is employed for convenience in description. Such switches are a standard commercial article as well as the sockets 7 and 8, and if any of these parts for any reason get out of order, they may readily be replaced, the switch tube being readily removable from the spring clip 13.

The terminals of the switch are connected by flexible conductors 16 and 17 to terminals of the sockets 7 and 8 respectively, the arrangement being such that when the mercury connects the terminals at one end of the switch tube, a circuit is established from the power supply through the socket 7, through the conductor 16, through the switch and the conductor 17 to the socket 8, thence to the motor device of the moistening apparatus H and thence back through the socket 8, the wire 7ª and the socket 7 to the power supply.

At the lower left-hand corner of the support 1 there is arranged a projecting bracket 18 of substantially U-shape carrying bearings 19 and 20 for a staff 21, the bearing 20 being adjustable to take up wear. A lever 22 is secured at one end to the staff 21 and projects to the right from its fulcrum point, and at a point a short distance to the right of the fulcrum this lever is provided with a screw-threaded opening for the reception of a removable shouldered attaching pivot screw 23. This pivot screw passes through an opening in a clip 24 permanently attached to the lower end of a substantially straight elongate sensitively responsive element 25 consisting of hygroscopic material, such, for example, as specially treated paper, hair, certain types of animal membranes, or the like, which varies in length in accordance with moisture conditions. The upper end of this member 25 is permanently secured to a clip 26 having an opening for the reception of the removable shouldered pivot screw 27, which engages an adjustable anchorage member 28. This anchorage member is provided with a screw-threaded stem 30 which passes up through an opening in a bracket 29 projecting from the supporting plate 1, and through a suitable opening formed in the cover 4. A nut 31 engages this screw-threaded member 30 and provides means for vertically adjusting the clip 26, thereby varying the initial tension of the member 25 to adjust the apparatus to respond to the desired degree of moisture. The member 25 with its clips 24 and 26 constitutes the prime motive means for actuating the switch and may be bodily removed from the apparatus merely by removing the screws 23 and 27. Thus when this part becomes ineffective through long use or injury it may readily be removed and replaced by a new part with but little loss of time.

At a point further removed from its fulcrum than the screw 23, the lever 22 is furnished with a threaded opening for the reception of a shouldered pivot screw 32 connecting the lower end of the link 33 to the lever. The opposite end of this link is pivotally secured in a shackle 34 projecting down from the block which carries the clip 13, this shackle being disposed laterally with respect to the staff 12 so as to provide a short lever arm for rocking the switch.

The operation of the device is as follows, it being assumed that the sensitively responsive member 25 has been properly adjusted by means of the nut 31. As thus adjusted switch tube 14 will remain substantially in the position shown in Fig. 1 (being prevented from tipping excessively to the right by engagement of the block 12' with a stop screw 35) until the moisture in the air drops below a predetermined value, thereupon the member 25 decreases in length, thus pulling up on the lever 22. The multiplying action of the connections is such that a very slight change in length of the member 25 is operative to tip the switch tube 14 so that the mercury will run down toward the left-hand end of the tube and complete the motor circuit for actuating the moisture supplying apparatus. When the air becomes sufficiently moist, the member 25 elongates, and the weight of the lever 22 and the link 33 restores the switch to its normal position, thus breaking the circuit. As shown in dotted lines in Fig. 1, the switch 14 may be moved in a counterclockwise direction to a position of overbalance in which the element 25 is slack or under no injurious tension, whatever the humidity. This positively precludes any possibility of imposing excessive tension upon this element, even while the latter is not in use. This will become apparent on referring to Fig. 1 wherein it will be seen that as the mercury 14 travels from the left end of the switch tube 15 toward the right end thereof the electrical circuit through the conductors 16 and 17 is broken and this circuit is only completed while the mercury is at the left end of the tube 15. Only a comparatively slight tilting of this tube 15 is necessary, therefore, to cause the mercury 14 to travel an amount sufficient to interrupt or to complete the electrical circuit. During normal operation only this slight amount of tilting occurs and it will be evident that this tilting in a counterclockwise direction will be effected by contraction of the element 25 which acting through the lever 22 and the link 33 will tend to produce a counterclockwise movement of the switch tube 15. As this movement is begun the mercury 14 travels along the tube 15 to a position at the left end thereof wherein the circuit through the conductors 16 and 17 is completed. As soon as this circuit is completed the humidifying apparatus controlled thereby is caused to function to correct the relative humidity and while this may require an appreciable interval of time the correction will ordinarily be effected before any substantial amount of tilting of the switch has taken place. It will also be observed that while the relative humidity is being corrected in this manner, during this brief interval the element 25 may continue to contract as in closing the electrical circuit through the conductors 16 and 17, no fixed element such as an abutment has been interposed in the path of contraction of the element 25 or any of the linkage connected thereto. This relieves the element 25 from excessive tension during the period while the relative humidity is being corrected to such a point that the element 25 will again undergo elongation.

When the relative humidity has been so corrected by the humidifying apparatus there is normally a tendency for the correction to overrun, that is to produce more elongation of the element 25 than that which would correspond to the desired degree of relative humidity. This is avoided, however, for as the element 25 elongates and the lever 22 and link 33 are permitted to descend due to their own weight and the weight of the switch tube 15 which is connected to these parts, the switch tilts in a clockwise direction and this causes the mercury 14 to travel from the left end of the tube 15 toward the right end thereof thereby breaking or interrupting the electrical circuit between the conductors 16 and 17. During this operation the weight of the mercury 14 will assist to some extent in producing a clockwise moment which will be effective in restoring the parts to the position shown in full lines in Fig. 1.

During ordinary conditions of every day use, as during the working hours of a day in a plant which is in operation, this device functions in the manner just set forth. However, there are times, as for example when a plant is shut down as from Saturday noon until Monday morning, and the electrical power is shut off so that the humidifying apparatus, which is controlled by an electrical circuit through the connections 16 and 17, can not function whether this circuit is completed or interrupted. If such a condition should exist and the element 25 were connected, as illustrated in Fig. 1, this element might contract to a point where it would suffer injury or permanent damage, as permanent elongation, due to excessive tension. This would occur if the element 25 were permitted to operate only in a given range for which it had been calibrated to control the relative humidity. If such an element should respond to the relative humidity and contract throughout its normal range of change in dimension without producing the desired change in relative humidity, continued contraction of the element would eventually subject the latter to injury or permanent damage as by producing permanent elongation of the element and require recalibration of the instrument. This condition is avoided with this apparatus by providing a construction and relative arrangement of parts which, after a given or predetermined amount of contraction of the element 25, move to a position in which the element 25 is slack or free from any injurious tension, whatever the relative humidity. This position of the parts is indicated in dotted lines in Fig. 1 and it will be seen that as the element 25 contracts and tilts the switch tube 15 is a counterclockwise direction, the mercury 14 travels to the left end and the transfer of the weight of this mercury from right to left reduces the clockwise moment and makes it easier to swing or tilt the switch 15 through a greater arc in a counterclockwise direction. When the mercury 14 is at the left end of the tube 15 in a position to complete the electrical circuit through the conductors 16 and 17, this mercury is substantially over the pivotal axis of the staff 12 about which the switch tilts and in this position the mercury has little or no effect in producing a clockwise moment to resist or oppose contraction of the element 25. If when the mercury reaches this position, and the power is off, so that even though the electrical circuit through the conductors 16 and 17 has been completed, the relative humidity will not be corrected, the element 25 on continuing to contract will swing the switch 15 to the overbalanced position indicated in dotted lines in Fig. 1 in which the mercury will travel to the extreme left end of the tube 15. When the parts are in these positions the link 33 has raised the lever 22 to such an angle that the element tends to become slack or free from tension whatever the humidity, that is the element 25 is not capable of contracting an amount sufficient to remain under substantial tension when the switch is in the position indicated in dotted lines in Fig. 1.

This movement of the switch to overbalanced position, as just described, would only occur during a substantial change in temperature or in relative humidity such as might occur over a weak-end when a plant was shut down and this, of course, would not happen if, before closing the plant, the element 25 had been disconnected as by loosening the nut 31 an amount sufficient to relieve this element of all tension. However, if this had not been done, the workmen, on returning to the plant on Monday morning, would find the switch 15 in the overbalanced position and would know that as soon as the power was switched on and the humidifying apparatus put in operation the relative humidity would be corrected to such a degree that the switch 15 could be tilted manually in a clockwise direction from this position of overbalance, as indicated in dotted lines, to the position shown in full lines in Fig. 4, and normal operation could thus be restored without any appreciable delay. It will also be observed that in manually restoring the device to position for normal operation in this manner there would be no necessity for recalibrating the element as it could have suffered no permanent elongation since it could not have been subjected to excessive tension.

An important feature of this construction resides in the arrangement of mechanism for actuating the switch without the use of springs or other resilient devices. As a practical matter, it is impossible to obtain springs having identical characteristics or even springs which are near enough alike to produce substantially the same action in devices of this character. Moreover when springs are used, the humidostat is subjected to a variable spring tension which reduces the sensitiveness of this element to changes in relative humidity. It will also be evident that the use of a tilting liquid switch provides for making and breaking an electrical circuit without placing the moisture responsive element 25 under injurious tension. In this respect, the present invention is a distinct improvement over prior devices in which a switch arm is moved against a fixed contact by contraction of a moisture-sensitive element, for in the latter arrangement the element may continue its contraction and therefore undergoes greater tension after the contact is made, and while the desired change in relative humidity is being effected. This causes progressive and permanent deformations or elongations of the element, and consequently reduces its sensitiveness and hence its utility. In the present construction these undesirable features are avoided and the element 25 is also relieved of the relatively slight tension due to the weight of the switch as soon as the block 12' of the latter comes to rest against the abutment or supporting means provided by the adjustable stop screw 35.

Furthermore the clip 13, which embraces and secures the switch in position, provides a releasable means for supporting this switch for removal so that if desired the switch may be turned end for end, in which event it will be apparent the making and breaking of the contacts will occur in the reverse order. Thus by merely reversing the position of this switch without other change in construction or arrangement of parts, the device may be adapted for regulating a dehumidifying apparatus. This is a decided advantage, as it makes it possible to use identically the same regulator for use with humidifying and dehumidifying apparatus.

The embodiment of the invention illustrated in Figs. 5 to 9 has the same general features of construction and the same general mode of operation as the device described with reference to Figs. 1 to 4. However, the device shown in Figs. 5 to 9 embodies improvements in construction and in the relative arrangement of parts which effect economies in spacial requirements and render this apparatus more pleasing in appearance as well as more suitable for many installations, such for example as those in which it is desirable to conceal the wiring. The embodiment also has an improved mode of operation which makes it possible to change the setting or to recalibrate the device by a simple adjustment which may be and preferably is effected exteriorly of the device when the cover is in place.

As shown herein by way of example, the device of Figs. 5 to 9 comprises a base plate or support member 51 having spacing elements such as the longitudinal rib 52 and the lugs 53, 54 and 56 disposed about the marginal portions of the base plate to fit within the cover or casing member 57 (Figs. 8 and 9). The cover may be releasably affixed to the base plate by means of an attaching screw (not shown) which engages the cover and is secured to the lug 56. This cover is provided with suitable openings 58 and 59 to facilitate ingress and/or circulation of the ambient air or other medium to which the device is intended to respond. The support plate 51 carries an angle bracket 61 to which the upper end of the moisture sensitive element or control member 62 is adjustably secured in any approved manner, preferably as described with reference to the corresponding parts of the device illustrated in Figs. 1 to 3. Similarly disposed levers 63 and 64 are mounted to extend transversely of the lower portion of the base plate 51. The moisture sensitive element 62 is provided at its lower end with a clip 66 which has a pivotal connection 67 with the lever 63. A link 68 has a pivotal connection 69 with this lever 63 and has its upper end portion extended laterally for connection with the circuit control means, here shown as a tilting liquid switch comprising a tube element 72. This tube 72 is releasably secured (to facilitate reversal) in a spring clip member 73 which is carried by a rotary spindle 74 (Fig. 6). This spindle is mounted between the upstanding arms of the U-shaped bracket 76 carried by the base plate 51. Preferably the parts are so proportioned and arranged that the lower transverse portion 77 of the spring clip 76 is adapted to engage the lower transverse portion of the bracket 76 to prevent excessive clockwise movement of the tilting switch. Preferably a pivot screw 71 provides a pivotal connection between the laterally extending upper end portion of the lever 68 and the spring clip 73. This lever 68 may also be bent or offset rearwardly, as illustrated in Fig. 6. Binding posts 78 and 79 are mounted centrally on the upper portion of the base plate 51 and leads 81 and 82 connect these binding posts with the terminals (not shown) of the tilting switch 72. This arrangement of the binding posts provides for concealing the wiring connections and facilitates installations by adapting the device for direct connection to a standard outlet box without requiring any special fittings or connections.

It will be understood that as the inclination of the tube element 72 changes in one direction or the other from the horizontal, the body of liquid within this tube element will be caused by the inclination of the tube to travel to or from the terminals of the switch and thereby either make or interrupt the circuit through the leads 81 and 82. It will also be seen that the lever 63 and the link 68 constitute a motion transmitting means for actuating the tilting switch in response to change in dimension of the moisture sensitive element or control member 62. Furthermore, the parts are proportioned and arranged to afford sufficient freedom of motion to permit the tilting switch 72 to assume the position of overbalance, indicated in dot and dash lines in Fig. 5 so as to avoid injury to the control member 62 in the event of excessive change in atmospheric conditions such as might occur if this control element should be left connected, and apparatus controlled by the circuit through the leads 81 and 82, such as humidifying or dehumidifying apparatus, were temporarily out of service, as above described with reference to the device of Fig. 1.

As a comparatively small change in dimension of the control member 62 is sufficient to operate the circuit control means, the present invention provides for utilizing selected increments of this possible total change of dimension of the control element for actuating this circuit control means and for rendering the apparatus responsive only to the selected increment of change by means only of a simple adjustment. This is accomplished in the illustrated embodiment by means of the lever 64 which is provided with a fixed pivot or fulcrum screw 83 mounted on the boss 84 (Fig. 7). The left end of this lever, as viewed in Fig. 7, is bent substantially into a U-shape to provide a mounting for a rotary spindle 86. This spindle passes through the lever 63 and under normal conditions of operation serves as a fulcrum for this lever. The other end of the lever 64 is bent forwardly and is in the form of a pointer which is adapted to travel over a scale 87 (Fig. 9) carried by the cover.

In the operation of the device it is desirable that the switch 72 should have a tendency normally to swing in a clockwise direction, and in order to provide this effect and to maintain the operating parts in a compact and efficient relationship the lever 63 is made comparatively short and a counterbalance or weight 88 is mounted on the free end of this lever. This counterbalance has substantially the same effect as the weight of the switch and the longer lever arm of the previous embodiment disclosed herein.

The manner of using the device, for selecting that desired increment in change of dimension of the moisture sensitive element to which the circuit control means is to respond, is illustrated in Figs. 10, 11 and 12, in which the scale 87 is indicated diagrammatically at 87'. In these views the axis of the main or fixed pivot 83 for the adjusting lever 64 is located at the intersection of the horizontal and vertical center lines 91 and 92. The parts in Fig. 12 are arranged in the same relative positions which they occupy in Fig. 5. The scale 87' may be calibrated to indicate the condition, such as the relative humidity, which it is desired to maintain. By moving the lever 64 upwardly or in a counterclockwise direction about its pivot 83, it will be seen that the left end of this lever which carries the spindle shaft 86 moves downwardly, as indicated in Fig. 11, wherein the spindle 86 is disposed just below the horizontal center line 91. This movement lowers the left end of the lever 63, as viewed in these figures, and consequently lowers the pivotal connection 67 between this lever and the moisture sensitive element 62. This is equivalent to recalibrating the element in a manner to increase the length thereof. During this movement of the lever 64 from the position shown in Fig. 12 to the position which this lever occupies in Fig. 11, the axis of the pivotal connection 69 between the link 68 and the lever 63 remains substantialy stationary and the lever 63 swings downwardly in a counterclockwise direction about this pivotal axis.

On further movement of the adjusting lever 64 to the position indicated in Fig. 10, the spindle shaft 86 is carried further below the horizontal center line 91 and the lever 63, due to its pivotal mounting on spindle shaft 86, continues its counterclockwise movement about the axis of the pivotal connection 69. This adjustment is also effected without substantial change in the position of the axis of the pivotal connection 69. This adjustment therefore functions to carry the axis of the pivotal connection 67 between the lever 63 and the moisture sensitive element 62 to a point still further below the horizontal center line 91. The effect of this adjustment therefore is to require greater contraction of the element 62 to raise the switch to an inclination sufficient to complete the circuit through the leads 81 and 82.

It will be seen that while the adjustments illustrated in Figs. 10 to 12 are being made, the adjusting lever 64 functions as a lever of the first class and the actuating lever 63 functions as a lever of the second class for changing the range through which the element 62 is effective for actuating the circuit control means. After the desired adjustment has been made the lever 64, of course, remains stationary as a fixed part and the spindle shaft 86 funstions as a fixed pivot for the actuating lever 63. On change in dimension of the moisture sensitive element 62, therefore, the lever 63 functions as a lever of the third class for transmitting motion from the moisture sensitive element through the link 68 to the circuit control means.

From the foregoing it will be seen that devices provided according to the present invention may be and preferably are of very simple form and compact and durable construction, and, as already pointed out, these devices may consist to a large extent of commercial parts, so that each device may be made up at a very low cost, and when for any reason such a device gets out of order, replacement parts may be purchased at almost any electrical supply store.

While desirable embodiments of the invention have been disclosed herein, it will be apparent that various modifications thereof are within the capacity of those skilled in the art to which this invention appertains, when informed by this specification and that the invention is not limited except as indicated by the appended claims.

I claim:

1. Control apparatus comprising a movable switch member, a control element responsive to variations in atmospheric conditions, and connections for transmitting motion from the control element to the switch member, said connections comprising adjustable means operative to vary the setting of the control element without thereby correspondingly varying the position of the switch member.

2. Control apparatus comprising a movable switch member, a control element responsive to variations in atmospheric conditions, a lever, means connecting the control element and the switch member, respectively, to the lever at spaced points in the length of the latter, a fulcrum for the lever disposed adjacent to the connection of the latter to the control element and about which the lever normally turns in response to operation of the control element, and means for adjusting the position of the fulcrum of the lever about the point of connection of the control element to the lever as a center.

3. Control apparatus comprising a movable switch member, a control element responsive to variations in atmospheric conditions, a lever, a movable fulcrum for the lever, means connecting the control element and the switch member to said lever at points differently spaced respectively but at the same side of the fulcrum of the lever, and means for adjustably positioning the fulcrum of the lever.

4. Control apparatus comprising a movable switch member, a control element which elongates and contracts in response to variations in atmospheric conditions, a lever, a movable fulcrum for the lever adjacent to one end thereof, means normally tending to swing the free end of the lever in a predetermined direction, means connecting the control element and switch member to the lever, the point of connection of the control element being nearer the fulcrum than the point of connection of the switch member, and a handle for adjustably positioning the fulcrum of the lever.

5. Control apparatus comprising a movable switch member, a control element variable in length in response to changes in atmospheric conditions, a lever arranged to swing in a substantially vertical plane, a movable fulcrum for the lever adjacent to one end of the latter, a weight secured to the lever and tending to swing the free end of the latter downwardly, upwardly extending members attached to the lever at points spaced different distances respectively from its fulcrum point and connecting the lever to the control element and to the switch member, respectively, and an adjusting lever constituting a support for the fulcrum of the first lever.

6. Apparatus of the class described comprising a control element responsive to variations in atmospheric conditions, a movable switch member for controlling an electrical circuit, a pair of similarly disposed levers, a fulcrum on one of the levers for the other lever of the pair, connections to the latter member at points spaced therealong on the same side of its fulcrum, one of said connections extending to said element and the other extending to said switch member, and a fulcrum for said one lever disposed intermediate the ends thereof.

7. Apparatus of the class described comprising a control element responsive to variations in atmospheric conditions, a movable switch member for controlling an electrical circuit, a lever of the first class, a lever of the third class having its fulcrum disposed on said lever of the first class, and connections between said lever of the third class and said element and said switch for rendering the latter responsive to said element.

8. Apparatus of the class described comprising a control element responsive to variations in atmospheric conditions, a movable switch member for controlling an electrical circuit, a motion transmitting member, connections from points spaced along said member to said element and said switch respectively, means for operating said member as a lever of the third class for rendering said switch responsive to said element, and means for operating said member as a lever of the second class for changing the range through which said element is effective for actuating said switch.

9. A device of the class described comprising a pivoted mercury switch, a pair of sockets, conductors connecting the terminals of the switch to the respective sockets, motion transmitting means for rocking the switch from one position to a second position, and motive means comprising an elongate band of moisture responsive material having clips secured to opposite ends of said band, means for removably and rigidly securing one clip to a fixed anchorage, and means for removably and rigidly connecting the other clip to the motion transmitting means, said motion transmitting means being so constructed and arranged normally to hold said moisture responsive element under tension while transmitting movement therefrom and to release said moisture responsive element of tension when said switch has been rocked to said second position.

10. Apparatus of the class described comprising a socket, relatively adjustable cup bearings, a staff having its ends disposed in the respective bearings, a mercury switch secured to the staff, said switch being movable from one position to a second position, a second staff, relatively adjustable cup bearings for the second staff, a lever carried by said second staff, a link connecting the switch with said lever, and motor means comprising an elongate moisture-sensitive element having an attaching clip permanently secured to each end, means rigidly securing one clip to said lever, said link and lever being constructed and arranged to hold said moisture-sensitive element under tension when said switch is in the first position and to release said moisture-sensitive element of tension when said switch is moved to said second position, and adjustable anchorage means rigidly secured to the other clip.

11. Apparatus of the class described comprising a support, a switch pivotally mounted thereon, motor means comprising a moisture-sensitive element for moving the switch from one position in which the moisture-sensitive element is under tension to a second position, and motion transmitting means interposed between said motor means and the switch, said motor transmitting means being constructed and arranged to multiply the motion of said element in transmitting it to the switch, and to release said moisture-sensitive element of tension when said switch is moved to said second position.

12. Control apparatus of the class described comprising a supporting plate having a marginal forwardly projecting flange, a perforated box-like cover normally engaging said flange, adjustable anchoring means supported by the plate and projecting outside of the cover, a pair of electrical sockets supported by the plate and having their plug-receiving ends exposed at the outside of the cover, a moisture-sensitive element within the cover having one end secured to the anchorage means, a mercury switch within the cover, said switch being pivotally supported by the plate, and connections for transmitting movement from the free end of the sensitive element to the switch for rocking the latter.

13. A device of the class described comprising a support member, an elongate moisture-responsive element disposed across the support member adjacent one edge thereof, sockets disposed along the opposite edge of the support member and spaced lengthwise of said element and laterally therefrom to leave a central space on the support member, a tilting switch mounted on the support member in this central space adjacent said element and arranged to extend between the sockets, electrical connections between the switch and the sockets, and means responsive to change in dimensions of the moisture-responsive element for tilting the switch.

14. A device of the class described comprising a tilting liquid switch mounted to pivot, abutment means for supporting the switch in one position about its pivot, the switch being freely movable about its pivot between the abutment means and a position of overbalance, a moisture-sensitive element connected for opposing movement of the switch toward the abutment means, the switch being operable for making and breaking a control circuit when actuated through a relatively small range of movement adjacent the abutment means in response to change in dimension of the moisture-sensitive element, the switch being movable to its position of overbalance for relieving the moisture-sensitive element of tension.

15. A device of the class described comprising a moisture-sensitive element, a tilting switch, connections for actuating the switch in response to change in dimension of the element, means for supporting the switch for free and unrestrained movement through an operating range extending from one position in which the element is slack, whatever the humidity, to a second position at which the switch becomes operative for changing the humidity, and means for relieving the element from tension due to the weight of the switch as the latter arrives approximately at the second position.

16. A device of the class described comprising a moisture-sensitive element, a tilting switch, connections for actuating the switch in response to change in dimension of the element, means for supporting the switch for free and unrestrained movement through an operating range extending from one position in which the element is slack, whatever the humidity, to a second position at which the switch becomes operative for changing the humidity, and means for limiting movement of the switch beyond said second position for relieving the element from tension above that required to bring the switch to the first position.

17. A device of the class described comprising a tilting switch mounted to pivot through a range of movement in which the switch is in a condition of unbalance about its pivot, the switch being operable in this range for making and breaking an electrical circuit, a moisture-sensitive element, means responsive to shortening of this element for lifting the switch through this range of movement, and means effective after a predetermined elongation of the element for relieving the latter from tension due to unbalance of the switch.

18. Apparatus of the class described comprising an elongate moisture-sensitive element, means anchoring one end of said element, a circuit controlling switch and connections for transmitting movement of the free end of said moisture-sensitive element, due to shrinkage in length thereof, to the switch for actuating the latter, the parts being so constructed and arranged that when the switch has been actuated by predetermined movement of the free end of said element in one direction further movement of said end in the same direction is unopposed by the switch.

19. Apparatus of the class described comprising an elongate moisture-sensitive element, means anchoring one end of said element, a tilting switch and connections for transmitting movement of the free end of said element to the switch for tilting the later, the parts being so constructed and arranged that when the switch has been tilted by predetermined movement of the free end of said element in one direction, further movement of said end in the same direction is assisted by unbalanced weight of the switch, thereby to relieve said moisture-sensitive element of injurious tension.

20. Apparatus of the class described comprising an elongate moisture-sensitive element, means for anchoring one end of said element, a circuit controlling switch and connections for transmitting movement of the free end of said element to the switch for actuating the latter, the parts being so constructed and arranged that as the moisture-sensitive element decreases in length it exerts force for moving the switch, but meets no further opposition to movement after the switch has been moved to a predetermined position wherein said moisture-sensitive element is relieved of injurious tension.

21. In apparatus of the character described, the combination of a moisture responsive element, a switch movable from one position to a second position, and means operative in response to change in dimensions of said moisture responsive element for moving said switch from said first position to said second position, said means holding said moisture responsive element under tension while effecting movement of said switch from said first position and being constructed and arranged to release said moisture responsive element of substantially all tension when movement of said switch to said second position has been effected.

22. A device of the class described comprising a moisture-sensitive element, a tilting switch, means for supporting the switch for free and unrestrained movement throughout an operating range extending from one position in which the element is slack, whatever the humidity, to a second position at which the switch becomes operative for changing the humidity, connections for actuating the switch in response to change in dimension of the element, said connections comprising rigid members operably connected together for transmitting motion between the moisture-sensitive element and the switch, said members being so constructed and arranged that excessive change in dimension of the moisture-sensitive element beyond that required for operating the switch is effective for moving the switch to said first position so as to relieve the moisture-sensitive element from substantial tension.

23. A device of the class described comprising a moisture-sensitive element, a tilting switch, connections for moving the switch in response to change in dimension of the moisture-sensitive element, the switch being effective in a given range of movement for controlling an electrical circuit, means for supporting the switch for movement through and beyond said given range of movement, said connections and said switch-supporting means being so constructed and arranged that the moisture-sensitive element is relieved of substantial tension as the switch moves beyond said given range of movement.

BERTRAM M. MILLS.